Oct. 1, 1935.　　　S. JOHNSON, JR　　　2,015,801
COMPRESSOR UNLOADING MECHANISM
Filed March 23, 1932　　　2 Sheets-Sheet 1
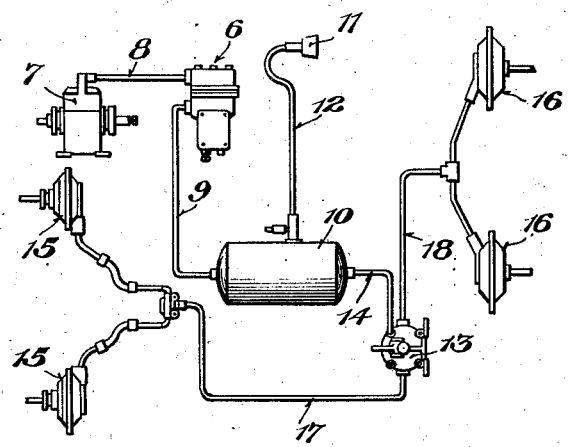
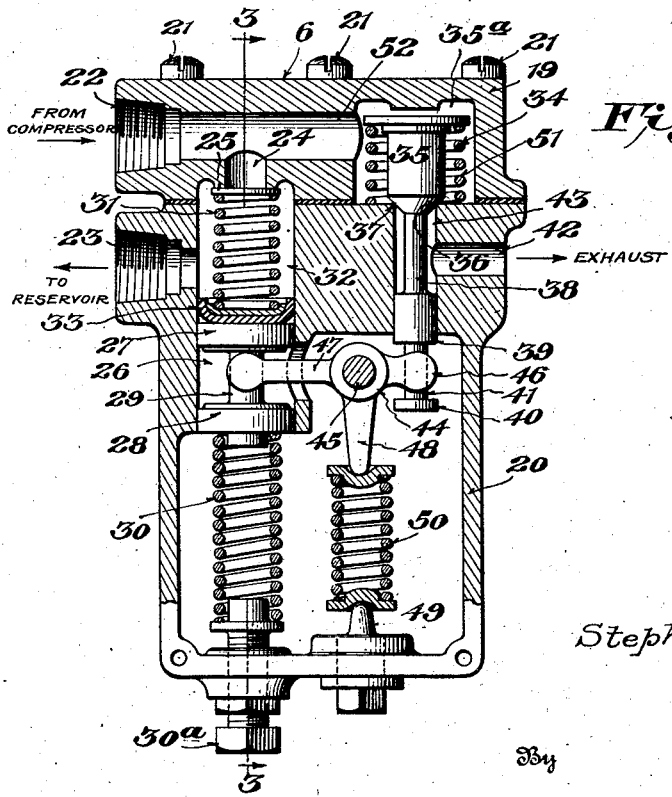
Inventor
Stephen Johnson, Jr.,
By
Attorney Oct. 1, 1935.  S. JOHNSON, JR  2,015,801
COMPRESSOR UNLOADING MECHANISM
Filed March 23, 1932  2 Sheets-Sheet 2

Inventor
Stephen Johnson, Jr.,

Attorney

Patented Oct. 1, 1935

2,015,801

UNITED STATES PATENT OFFICE 2,015,801

COMPRESSOR UNLOADING MECHANISM

Stephen Johnson, Jr., Pittsburgh, Pa., assignor to Bendix Westinghouse Automotive Air Brake Company, Pittsburgh, Pa., a corporation of Delaware Application March 23, 1932, Serial No. 600,791

5 Claims. (Cl. 137—153)

This invention relates to compressors, and more particularly to a combined governing and unloading device for a fluid compressor.

Fluid compressor governing and unloading devices have heretofore been provided for compressors adapted for use in connection with fluid pressure braking systems wherein the compressor is operated continuously, for the purpose of unloading the compressor when the pressure of the compressed fluid within the reservoir has reached a predetermined value. In such devices heretofore utilized, however, some difficulty has been encountered in adjusting the various parts in order to obtain a precise and satisfactory manner of operation. As will be readily perceived, it is highly desirable to maintain a substantially constant pressure within the reservoir and to this end the combined governor and unloader should be so constructed that the unloading operation will occur in a positive manner when a predetermined pressure has been reached within the reservoir, and the unloading operation should be definitely interrupted upon a substantially slight decrease in the pressure of the fluid within the reservoir. Such an operation will serve to replenish the supply of compressed fluid upon a slight decrease of the pressure of the fluid in the reservoir and thus maintain a substantially constant pressure therein.

It is accordingly one of the objects of the present invention to provide a combined governing and unloading mechanism so constituted as to avoid the difficulties heretofore encountered in devices of this character.

Another object of the invention is to provide a novel unloading mechanism for a fluid compressor so constructed as to be capable of positive operation in order to interrupt the unloading operation when the pressure of the fluid within the reservoir has been only slightly reduced.

Another object is to provide in a mechanism of the above character a novel construction embodying a snap acting element whereby partial unloading of the compressor is eliminated, the unloading operation positively occurring at a predetermined pressure.

Still another object of the invention is to provide in a fluid compressor unloading device a novel operating mechanism including a pressure-sensitive element subject to the pressure of the fluid compressed and interconnected with the unloading mechanism through a novel connection including lost motion couplings, whereby the unloading action will be rendered completely operable and completely inoperable by movements of the pressure-sensitive element.

A further object is to provide a fluid pressure governing and unloading mechanism of relatively few parts, so arranged as to be unusually efficient and positive in operation and constructed in such a manner as to be operable to either fully load or fully unload the compressor.

Other objects and novel features of the invention will appear more fully hereinafter from the following detailed description of the invention when taken in connection with the accompanying drawings. It is to be expressly understood, however, that the drawings are designed for purposes of illustration only and are not to be taken as a definition of the limits of the invention, reference being had for this purpose to the appended claims.

In the drawings wherein similar reference characters refer to similar parts throughout the several views:

Fig. 1 is a diagrammatic arrangement of a fluid pressure braking system embodying a combined governor and unloader constructed in accordance with the principles of the present invention;

Fig. 2 is a front sectional view of the combined governor and unloader, this view illustrating an unstable condition of the device;

Figure 4:
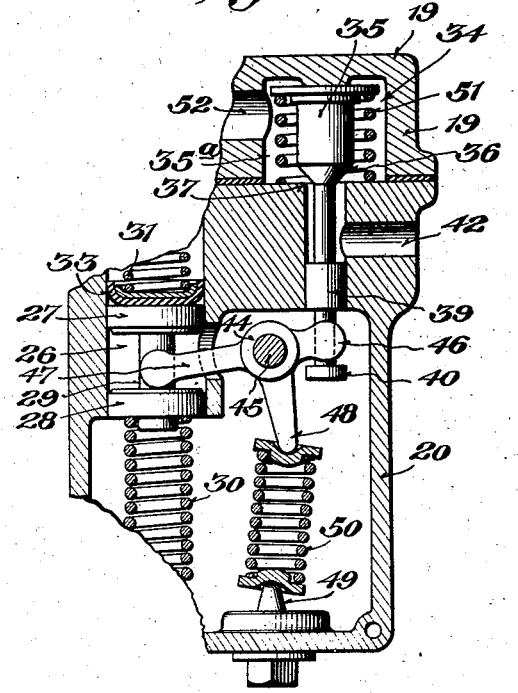
Fig. 4 is a fragmentary sectional view of the parts illustrated in Fig. 2 showing the device in unloading position.

Referring to the drawings and more particularly to Fig. 1, a combined fluid pressure governing and unloading mechanism 6 is disclosed therein in combination with the usual elements of a fluid pressure braking system for use, for example, on automotive vehicles, said system including a compressor 7 connected by suitable pipes 8 and 9 with a reservoir 10, the device 6, constituting the present invention, being interposed between the compressor and reservoir. A pressure gauge 11 of suitable construction is associated with the reservoir 10 by pipe 12 in order to indicate the pressure of the fluid in the reservoir. A suitable brake valve device 13 is connected with the reservoir through a pipe 14 and upon actuation of said valve fluid under pressure is admitted to brake chambers 15 and 16 associated with the vehicle front and rear brakes respectively, through pipes 17 and 18.

Referring more particularly to Fig. 2, the combined governing and unloading device 6 constituting the present invention is illustrated therein as including a casing having upper and lower portions 19 and 20 secured together as by means of screws 21, the top portion being provided with an inlet opening 22 and communicating bore 52, the said opening being connected with the compressor through pipe 8. The bottom portion 20 is provided with an outlet opening 23 adapted to communicate with the reservoir 10 through pipe 9. Both of these openings are in communication with each other through a port 24, this port being preferably closed by check valve 25 in order to prevent loss of pressure from the reservoir during unloading of the compressor, as will appear more fully hereinafter.

Means are provided within the casing 19, 20 for unloading the compressor when the pressure within the reservoir attains a predetermined value. Preferably the operation of such means is effected by movement of a governor or pressure-sensitive element 26 subject to the pressure of the fluid compressed and, as shown, such element includes upper and lower spaced pistons 27 and 28 interconnected by rod 29, the pressure-sensitive element being resiliently positioned by means of springs 30 and 31 in a chamber 32 formed in the casing and in open communication with the outlet opening 23. As shown, a fluid sealing cup washer 33 is positioned on top of the piston 27 and is held in intimate contact therewith and in fluid sealing engagement with the walls of the chamber 32 by means of the spring 31.

As shown in Fig. 2, an unloading valve 34 is contained within the casing 19, 20 and is constituted by an upper valve member 35 within a chamber 35ᵃ connected with the bore 52, the said valve member having a bevelled seat portion 36 adapted to have fluid sealing engagement with a valve seat 37 formed in the lower casing member when the parts are in the position shown. Integrally formed with the valve member 35 is a reduced stem 38, the lower portion of which is formed as an abutment 39 which in turn is connected with an abutment 40 by means of rod 41. Located within the side of the casing member 20 is an exhaust port 42 which communicates with bore 43 surrounding the reduced portion 38 of the valve member.

In order to effect positive and rapid movement of the unloading valve due to changes in pressure within the reservoir which in turn effect movement of the pressure-responsive element 26, the latter is preferably interconnected with the former through a snap-acting device including a lever element. As shown, such device is constituted by a lever 44 pivotally mounted at 45 to the casing 20, the said lever being provided with oppositely-extending arms 46 and 47, the ends of these arms being so formed as to straddle the rods 29 and 41, as shown more particularly in Fig. 3. It will be observed from Fig. 2 that each of the arms 46 and 47 has a lost motion connection with the unloader valve 34 and pressure-sensitive element 26 respectively, such lost motion being limited in the case of the unloader valve by the position of abutments 39 and 40 and in the instance of the pressure-sensitive element by the spacing between upper and lower pistons 27 and 28 respectively.

In order to impart a snap action to the lever 44, the latter is provided with an arm 48 aligned with the pivot 45 and extending perpendicularly to the plane including arms 46 and 47. Vertically aligned with pivot 45 is an abutment 49 adjustably mounted in the casing 20 and interposed between this abutment and the outer extremity of the arm 48 is a spring 50 which is so arranged as to effect rapid movement of the lever 44 in one direction or the other depending upon a slight movement of the arm 48 to one side or the other of the vertical plane including the abutment 49 and the pivot 45. As well understood by those skilled in the art, the arm 48 and spring 50 associated therewith constitutes a snap acting arrangement for moving lever 44 in one direction or the other past a dead center position of unstable equilibrium. It is to be pointed out that the position of the parts indicated in Fig. 2 is an unstable position and it is evident that during operation of the device this position will not be occupied more than momentarily.

Figure 3:
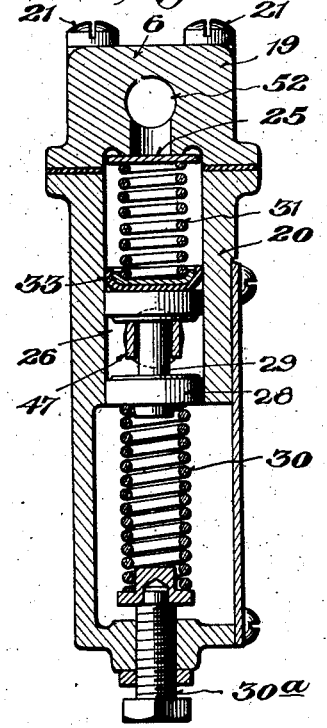
Fig. 3 is a sectional view taken along line 3—3 of Fig. 2.

Preferably, the parts are so adjusted that the difference between the cut-in and cut-out pressures of the governor is relatively low, as for example, fifteen pounds. In other words, with the device in unloading position, as shown in Fig. 3, a decrease of fifteen pounds in the pressure of the fluid in the reservoir will actuate the pressure-sensitive element 26 to such an extent as to effect a closure of the unloading valve. In order, however, to adjust the operating range of the governor, the spring 30 is mounted in such a manner that the tension thereof may be varied, as by means of an adjusting screw 30ᵃ. It is obvious that with this construction, adjustment of the tension of this spring will vary the pressure at which unloading occurs, but that the difference between the cut-in and cut-out pressures will remain unchanged.

Figure 5:
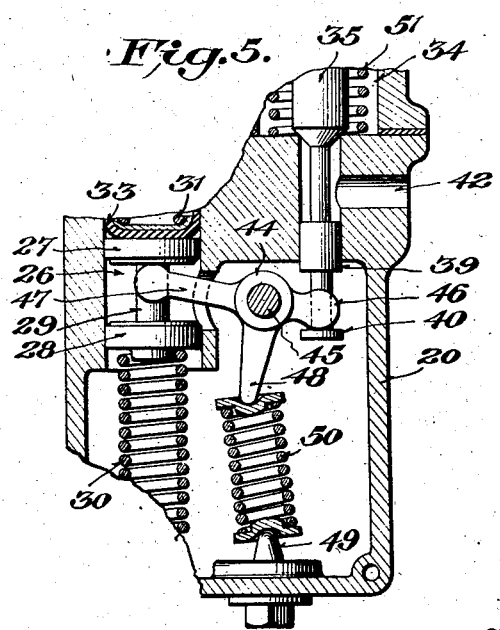
Fig. 5 is a fragmentary sectional view of the parts illustrated in Fig. 2 and showing the device in normal operative position.

In operation, fluid compressed by the compressor will be conducted through pipe 8 and opening 22 to the bore 52 of the device 6 and hence past the check valve 25 into the chamber 32 and will be conducted from this chamber through outlet 23 and pipe 9 to the reservoir, the parts during normal operation occupying the position shown in Fig. 5. As the pressure within the reservoir and hence the pressure in chamber 32 communicating therewith rises, the pressure-sensitive element 26 will be moved downwardly, as viewed in Fig. 5, until a position of unstable equilibrium such as that shown in Fig. 2 will be attained, it being pointed out that such movement of the element 26 will effect a counterclockwise rotation of lever 44 about its pivot 45. Upon a further increase of the pressure of the fluid within chamber 32, the pressure-sensitive element 26 will be moved an additional distance downwardly, further rotating the lever 44 counterclockwise about its pivot 45 until the arm 48 moves slightly to the right of the vertical plane including the abutment 49 and pivot 45, whereupon the spring 50 will be effective to cause a rapid counterclockwise movement of the lever 44, the arm 46 contacting abutment 39 to move the unloader valve 34 upwardly to open position. The tension of a spring 51 constantly urges valve 34 to full open position, the said spring maintaining the unloading valve in open position, as shown in Fig. 4, after the valve has been opened by arm 46 in the unloading operation. The compressor will thereafter continue to unload through pipe 8, opening 22, bore 52, chamber 35ᵃ, and exhaust port 42, any escape of fluid under pressure through the exhaust port from the reservoir being prevented by the check valve 25. It will be observed from Fig. 4 that after the unloading valve is opened, arm 46 no longer contacts with the abutment 39, the spring 51 thereafter serving to maintain the valve in unloading position.

After the fluid under pressure is utilized from the reservoir, as for example during brake applications, the pressure of the fluid therein will be gradually reduced and this reduction in presure within the reservoir and chamber 32 will be followed by a return of the pressure-sensitive element 26 to normal position, the rate of return of this element being determined by the tension of springs 30 and 31. In other words, during a gradual decrease in the pressure of the fluid within chamber 32, the lever 44 will be slowly rotated about its pivot 45 in a clockwise direction and when the lever has been rotated to such an extent that the arm 48 has been moved slightly to the left of the vertical plane including pivot 45 and abutment 49, as shown in Fig. 2, the spring 50 will again be effective to cause rapid clockwise movement of the lever 44 about its pivot to cause arm 46 to contact the lower abutment 40, which operation will serve to immediately close the unloader valve 34 against the tension of its associated spring 51. The clockwise movement of lever 44 also causes arm 47 to abut the upper piston 27. The unloading action of the compressor is thus definitely and positively interrupted and the fluid thereafter compressed by the compressor will be conducted to the reservoir in the normal manner.

It will be appreciated that as the pressure within the reservoir slowly rises, downward movement of the governor or pressure-sensitive element 26 will effect a counterclockwise movement of the lever 44 and the outer extremity of arm 46 will leave the abutment 40 associated with the unloading valve 34, and gradually take up the lost motion between abutments 40 and 39. Under these conditions, the pressure of the fluid within chamber 35ª on the head of the upper valve member 35 will be sufficient to overcome the tension of spring 51 to maintain the valve 34 closed. When, however, the unloading valve 34 has been moved to open position, since the pressure surrounding the valve member 35 will be balanced, the tension of the spring 51 will be sufficient to hold the unloading valve open, notwithstanding clockwise movement of the lever 44 about its pivot and resultant movement of the outer extremity of arm 46 away from abutment 39.

There is thus provided by the present invention a novel combined governing and unloading mechanism for fluid compressors embodying a structure which is not only extremely positive in operation but is so constituted that the difference between the pressures at which the compressor is unloaded and that at which the unloading operation is interrupted is substantially slight. The provision of the snap-acting construction enables a positive, quick-acting loading and unloading operation to be secured, it being observed that as soon as the pressure-sensitive element has been moved a sufficient amount to effect unloading, the unloading valve is opened a maximum amount, and as soon as the pressure of the fluid within the reservoir has decreased a predetermined extent, the unloading valve will be immediately closed, in order to effect an interruption of the unloading operation. The provision of the lost motion couplings between the snap-acting element, the unloader valve and the pressure-sensitive element prevents the unloading valve from attaining any intermediate position between closed and fully opened position, which feature is especially important in securing a positive and quick-acting operation.

While only one embodiment of the invention has been illustrated and described, it is to be understood that the invention is not limited thereto but may be embodied in various mechanical forms, as will now appear to those skilled in the art. Reference will therefore be had to the appended claims for a definition of the limits of the invention.

What is claimed is:

1. A fluid compressor unloader having a pressure-senstive element subject to the pressure of a compressed fluid, a check valve interposed between the compressor and said element, a valve for unloading said compressor, a member connected with said valve through a lost motion coupling, said member being actuated by said element to take up the lost motion in said coupling to effect complete opening of said valve for unloading the compressor, and resilient means for maintaining said valve open and for effecting relative movement between the parts constituting said lost motion coupling upon unloading of the compressor.

2. A fluid pressure governor comprising a casing having an inlet, an outlet and an exhaust opening, said inlet communicating with said outlet and said exhaust opening, a valve in said casing controlling communication between said inlet and said exhaust opening, means resiliently urging said valve to open position, said valve being normally maintained closed by the pressure of fluid in said inlet, and means for effecting opening and closing movements of said valve.

3. A fluid pressure governor comprising a casing having an inlet, an outlet and an exhaust opening, said inlet communicating with said outlet and said exhaust opening, a valve in said casing controlling communication between said inlet and said exhaust opening, means resiliently urging said valve to open position, said valve being normally maintained closed by the pressure of fluid in said inlet, a pressure sensitive element responsive to back pressure in said outlet and a connection between said element and said valve, said connection including a lost motion coupling.

4. A fluid pressure governor comprising a casing having an inlet, an outlet, and an exhaust opening, a valve controlling said exhaust opening, a pressure sensitive element connected to said valve for controlling the same and opposed resilient means on either side of said pressure sensitive element.

5. A fluid pressure governor comprising a casing having an inlet, an outlet, and an exhaust opening, a valve controlling said exhaust opening, a pressure sensitive element connected to said valve for controlling the same, a check valve between said inlet and outlet, resilient means urging said check valve to closed position, said resilient means also acting on said pressure sensitive element and a second resilient means acting on said pressure sensitive element in a direction opposite to that of said first resilient means.

STEPHEN JOHNSON, Jr.